United States Patent [19]
Alexander et al.

[11] Patent Number: 5,557,439
[45] Date of Patent: Sep. 17, 1996

[54] EXPANDABLE WAVELENGTH DIVISION MULTIPLEXED OPTICAL COMMUNICATIONS SYSTEMS

[75] Inventors: Stephen B. Alexander, Millersville; Steve W. Chaddick, Annapolis; Victor Mizrahi, Columbia, all of Md.

[73] Assignee: Ciena Corporation, Columbia, Md.

[21] Appl. No.: 507,659

[22] Filed: Jul. 25, 1995

[51] Int. Cl.⁶ .................................................. H04J 14/02
[52] U.S. Cl. ........................... 359/130; 359/124; 359/127
[58] Field of Search ................................... 359/124, 127, 359/125, 130, 133, 161

[56] References Cited

U.S. PATENT DOCUMENTS

| | | | |
|---|---|---|---|
| 4,923,271 | 5/1990 | Henry et al. | 359/130 |
| 5,121,244 | 6/1992 | Takasaki | 359/125 |
| 5,173,794 | 12/1992 | Cheung et al. | 359/133 |
| 5,283,686 | 2/1994 | Huber | 359/337 |
| 5,448,388 | 9/1995 | Ohde et al. | 359/125 |
| 5,457,760 | 10/1995 | Mizrahi | 359/130 |
| 5,467,212 | 11/1995 | Huber | 359/126 |

*Primary Examiner*—Leslie Pascal
*Attorney, Agent, or Firm*—Margaret A. Burke

[57] ABSTRACT

The present invention provides wavelength division multiplexed optical communication systems configured for expansion with additional optical signal channels. In one embodiment, the WDM system comprises N source lasers for producing N optical signal channels, each channel having a unique wavelength where N is a whole number greater than or equal to 2. An optical multiplexer module having N+x inputs, where x is a whole number greater than or equal to 1, optically communicates with each of the N source lasers. The N+x input ports of the multiplexer are configured such that the N input ports are optically coupled to the N source lasers and the x input ports are supplemental ports not optically coupled to the N source lasers. An optical transmission path optically communicates with the multiplexer for carrying a multiplexed optical signal comprising the N optical signal channels. N optical channel selecting modules are provided, each selecting module including a Bragg grating configured to select a unique optical channel wavelength. An optical splitter module optically communicates with the optical transmission path and the optical channel selecting modules. The optical splitter includes N+y output ports, where y is a whole number greater than or equal to 1. The N+y output ports are configured such that each of the N output ports is optically coupled to one of the N optical channel selecting modules and the y output ports are supplemental ports not optically coupled to the N optical channel selecting modules.

7 Claims, 1 Drawing Sheet

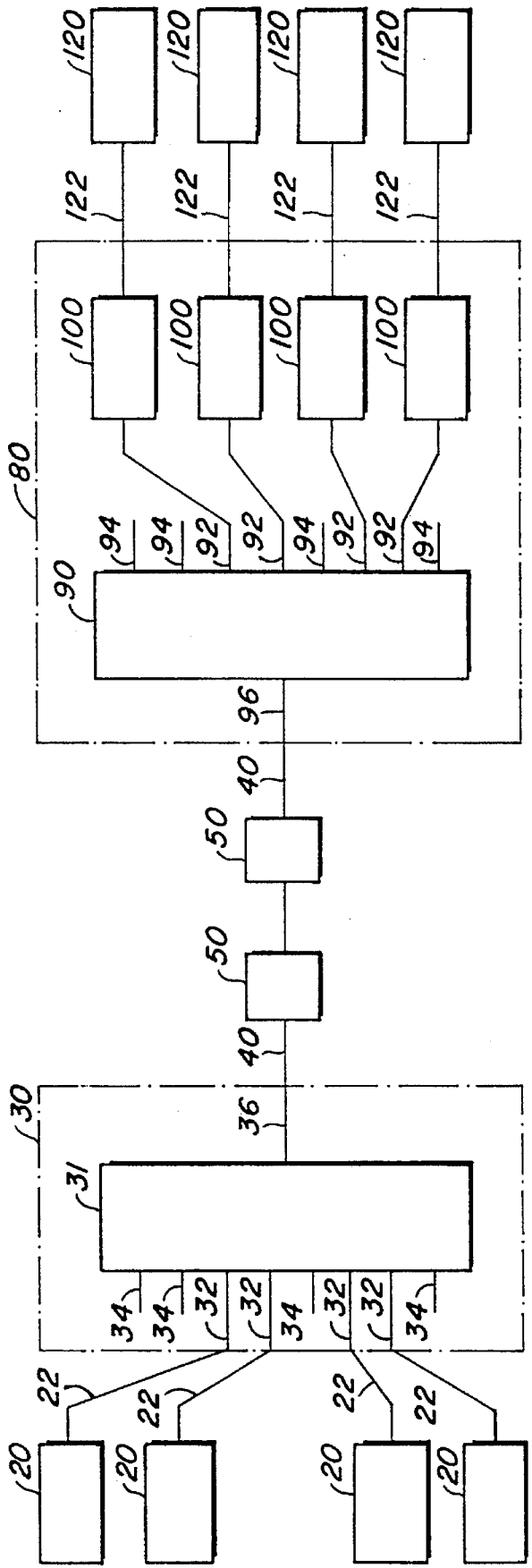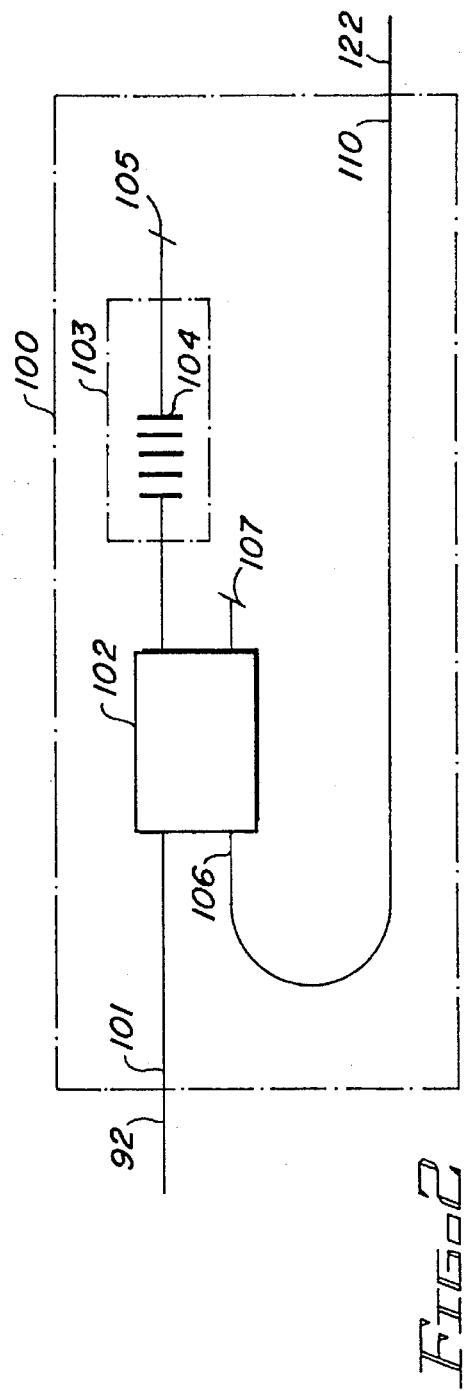

EXPANDABLE WAVELENGTH DIVISION MULTIPLEXED OPTICAL COMMUNICATIONS SYSTEMS

FIELD OF THE INVENTION

The invention relates to wavelength division multiplexed optical communication systems, particularly, wavelength division multiplexed optical communication systems which include modular components configured for system expansion.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems,* (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, signal channels are generated, multiplexed, transmitted over a single waveguide, and demultiplexed to individually route each channel wavelength to a designated receiver. Through the use of optical amplifiers, such as doped fiber amplifiers, plural optical channels are directly amplified simultaneously, facilitating the use of WDM systems in long-distance optical systems.

Proposed wavelength division multiplexed optical communication systems typically include multiplexer and demultiplexer designs which permit only a fixed number of optical channels to be used in the optical system. In one optical system configuration, the multiplexed signal is broken down into its constituent optical signals through the use of an integrated frequency router demultiplexer. The frequency router uses silicon optical bench technology in which plural phosphorus-doped silica waveguides are disposed on a silicon substrate. An optical star outputs to an array of N waveguides having adjacent optical path lengths which differ by q wavelengths; this array in turn feeds an output N×N star. This frequency router design for an optical communication system is described in Alexander et al., *J. Lightwave Tech.,* Vol. 11, No. 5/6, May/June 1993, p. 714, the disclosure of which is incorporated herein by reference. Using a 1×N configuration at the input, a multiplexed optical signal containing light of different frequencies is separated into its component frequencies at each waveguide extending from the output N×N star. Although this configuration adequately separates light of different frequencies, the integrated optical design fixes both the number and the respective frequencies of the optical channels. Consequently, adding or decreasing the number of optical channels or changing the channel wavelength or spacing is not possible without providing a completely new frequency router demultiplexer to the optical system.

Other proposed WDM optical communication systems employ gratings-based demultiplexers in which Bragg gratings are used to create a transmission filter having a passband corresponding to the selected optical channel. Such a demultiplexer for a four-channel WDM system is depicted in Mizrahi et al., *Electronics Letters,* Vol. 30, No. 10, May, 1994, p. 780, the disclosure of which is incorporated herein by reference. A 1×4 fused fiber splitter has a fiber transmission filter spliced to each of its four output ports. Two Bragg gratings are written into the filters which pass the desired channel wavelength and which reject the other three channel wavelengths. While this design is acceptable for a limited number of fixed optical channels, transmission-based filters must be designed to reject all non-selected channels for each demultiplexer output; their use therefore requires advance knowledge of all system channels and their respective wavelengths. Consequently, the described gratings-based transmission filter demultiplexer does not facilitate expansion of the WDM system with additional optical channel wavelengths.

Thus, there is a need in the art for improved wavelength division multiplexed optical communication systems which are configured to carry varying quantities of optical signal channels at various channel frequencies. Such WDM optical communication systems would be readily expandable for carrying increased numbers of optical channels when there is a need for greater system capacity.

SUMMARY OF THE INVENTION

The present invention provides wavelength division multiplexed optical communication systems configured for expansion with additional optical signal channels. In one embodiment, an expandable wavelength division multiplexed optical communication system is provided having at least N wavelengths, where N is a whole number greater than or equal to 2. The WDM system comprises N source lasers for producing N optical signal channels, each channel having a unique wavelength. An optical multiplexer module with N+x inputs, where x is a whole number greater than or equal to 1, optically communicates with each of the N source lasers. The N+x input ports of the multiplexer are configured such that the N input ports are optically coupled to the N source lasers and the x input ports are supplemental ports not optically coupled to the N source lasers. An optical transmission path, such as a fiber optic waveguide, optically communicates with the multiplexer for carrying a multiplexed optical signal comprising the N optical signal channels.

N optical channel selecting modules are provided, each selecting module including at least one Bragg grating configured to select a unique optical channel wavelength. An optical splitter module optically communicates with the optical transmission path and the optical channel selecting modules. The optical splitter includes N+y output ports, where y is a whole number greater than or equal to 1. The N+y output ports are configured such that each of the N output ports is optically coupled to one of the N optical channel selecting modules and the y output ports are supplemental ports not optically coupled to the N optical channel selecting modules.

In another aspect, the present invention provides a wavelength division multiplexed optical communication system including a modular demultiplexer. The WDM system includes N optical channel wavelengths, where N is a whole number greater than or equal to 2. In the system, plural transmitter elements produce N optical channel wavelengths and plural receiving elements receiving the N optical channel wavelengths. An optical waveguide optically communicates with the plurality of transmitting elements and the plurality of receiving elements for carrying a multiplexed optical communication signal including the N optical channel wavelengths. A modular demultiplexer optically communicates with the optical waveguide. The modular demultiplexer comprises an optical splitter module having a splitter input port which optically communicates with the optical waveguide for receiving the multiplexed optical signal. The splitter includes a plurality of output ports, each output port conveying a portion of the multiplexed optical signal to a modular wavelength selector.

Separately packaged modular wavelength selectors are provided in the demultiplexer. Each wavelength selector module includes a wavelength selector input port optically coupled to an optical splitter module output port and a wavelength selector output port optically coupled to at least one optical receiver. Each wavelength selector module includes at least one Bragg grating with each grating configured to select one optical channel wavelengths. Fewer than N optical channel wavelengths are selected from the multiplexed optical communication signal by any individual wavelength selector module.

The present invention also provides methods for expanding the capacity of wavelength division multiplexed optical communication systems constructed in accordance with the present invention.

BRIEF DESCRIPTION OF THE DRAWINGS

FIG. 1 is a schematic representation of a wavelength division multiplexed optical communication system according to one embodiment of the present invention.

FIG. 2 is a schematic representation of a wavelength selecting module for use in the optical communication system of FIG. 1.

DETAILED DESCRIPTION

Turning now to the drawings in detail in which like numerals indicate the same or similar elements, FIG. 1 schematically depicts a wavelength division multiplexed optical communication system 10 according to one embodiment of the present invention. Optical communication system 10 includes a plurality of optical transmitters 20, each optical transmitter emitting an information-bearing optical signal at an optical channel wavelength. The expression "information-bearing optical signal," as used herein, refers to an optical signal which has been coded with information, including, but not limited to, audio signals, video signals, and computer data. The WDM optical communication systems of the present invention include N channels, where N is a whole number greater than or equal to 2. Exemplary values for N are 4, 8, and 16 optical channels. In the optical system of FIG. 1, N is depicted as 4 for ease of illustration.

Each optical transmitter 20 generally includes a laser, such as a DFB semiconductor laser, a laser controller, and a modulator for creation of an information-bearing optical signal. In an exemplary embodiment, the transmitter laser is a DFB semiconductor diode laser, generally comprising one or more HI-V semiconductor materials, commercially available from a wide variety of suppliers such as Fujitsu, GEC Marconi, and Hewlett-Packard. The laser outputs an optical carrier signal at a particular channel wavelength corresponding to a selector module wavelength included in a demultiplexer. The laser controller provides the required laser bias current as well as thermal control of the laser. Using thermal control, the precise operating wavelength of the laser is maintained, typically to within a one angstrom bandwidth.

The optical transmitter typically includes a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier signal is split between the two optical paths. At least one path of the interferometer is phase modulated. When the signal is recombined at the output, the light from the paths either constructively or destructively interferes, depending upon the electrical field applied to the surrounding electrodes during the travel time of the carrier. This recombination creates an amplitude-modulated output optical signal. The optical carrier signal can alternatively be directly modulated for some system applications. It is noted that while the above-described transmitters are exemplary, any transmitting elements capable of producing optical signals for use in an optical communication system can be employed in the WDM systems of the present invention.

Typically, the wavelengths emitted by optical transmitters 20 are selected to be within the 1500 nanometer range, the range in which the minimum signal attenuation occurs for silica-based fibers. More particularly, the wavelengths emitted by the optical transmitters are selected to be in the range from 1540 to 1560 nanometers. However, other wavelengths, such as those in the 1300–1500 nm range and the 1600 nm range, can also be employed in the WDM systems of the present invention.

When optical transmitters 20 form part of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide. The use of optical remodulators ensures compatibility of optical communication system 10 with currently-deployed transmission equipment. Further description of wavelength division multiplexed optical communication systems with remodulators is found in co-pending U.S. patent application Ser. No. 08/438, 844 the disclosure of which is incorporated by reference herein. Further description of optical transmitters which may be employed in the optical communication systems of the present invention are described in Gowar, *Optical Communication Systems,* incorporated by reference above. Generally, optical amplifiers (not shown) are used to increase the transmitted signal power following modulation.

Each information-bearing optical signal produced by an optical transmitter (or an optical remodulator, if present) constitutes a channel in optical system 10, the wavelength of which corresponds to a selector module wavelength in a demultiplexer. As depicted in FIG. 1, four optical transmitters are provided to create a four-channel wavelength division multiplexed optical communication system. These optical signal channels are output from transmitters 20 and are brought together in multiplexer 30 for conveyance to optical waveguide 40.

Multiplexer 30 combines plural optical channels from transmitters 20 onto a single output to create a multiplexed optical signal. Multiplexer 30 includes optical combiner 31 having N input ports 32 and x input ports 34, where x is a whole number greater than or equal to 1. For the configuration depicted in FIG. 1, N=4 and x=4. The N input ports are optically coupled to the N transmitters 20 through optical waveguides 22. The x input ports are supplemental input ports which are not coupled to transmitters 20. The x input ports configure the multiplexer to be readily coupled to additional optical transmitters for incremental system expansion. Exemplary optical combiners 31 are selected from passive splitters available from Corning, Inc., Corning, N.Y., wideband single mode splitters available from IOT Integrierte Optik GmbH, Waghausel-Kirrlach, Germany, and fused fiber combiners available from Gould, Inc., Millersville, Md. Alternatively, solid state optical combiners can be employed as multiplexers in the WDM systems of the present invention.

The combination of channels forms a multiplexed optical signal which is output to optical transmission path 40 through multiplexer output port 36. Optical transmission path 40 is typically an optical waveguide and is the principal transmission medium for the optical communication system. The optical waveguide is generally selected from single-mode optical fibers such as SMF-28, available from Corning, and TRUEWAVE, available from AT&T Corp. However, any optical waveguiding medium which is capable of transporting multiple optical wavelengths can be employed as waveguide 40 in optical system 10.

Optionally, one or more optical amplifiers 50 are interposed along optical transmission path 10. Optical amplifiers 50 are selected from any device which directly increases the strength of plural optical signals without the need for optical-to-electrical conversion. In general, optical amplifiers 50 are selected from optical waveguides doped with a material which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped. Optical amplifiers, their materials, and their operation are further described in Gowar, Ed., *Optical Communication Systems*, incorporated by reference above, Bjarklev, *Optical Fiber Amplifiers: Design and System Applications*, (Artech House, Norwood, Mass.), c. 1993, the disclosure of which is incorporated herein by reference, and in Desurvire, *Erbium-Doped Fiber Amplifiers*, (John Wiley & Sons, Inc., N.Y.), c. 1994, the disclosure of which is incorporated herein by reference. Exemplary optical amplifier configurations for use with the WDM optical communication systems of the present invention are described in copending U.S. patent application Ser. Nos. 08/457,292 and 08/438,844, the disclosures of which are incorporated by reference herein.

Following transmission and amplification of the multiplexed optical signals along waveguide 60, each channel must be demultiplexed and routed to the receiver designated for the particular optical signal channel. The multiplexed signal is input to demultiplexer 80. Demultiplexer 80 comprises an optical splitter 90 which receives the multiplexed optical signal through input port 96 and places a portion of the multiplexed signal onto each of N output paths 92 and onto each of y output ports 94 where y is a whole number greater than or equal to 1. For the optical system depicted in FIG. 1, N=4 and y=4. Optical splitter 90 is selected from any optical device which can divide an incoming optical signal and place it onto plural output paths. Exemplary splitters include passive optical components such as those components described for use as optical combiner 31.

While a single optical splitter is depicted in the drawings, it is understood that plural optical splitters can also be employed, particularly for dense WDM optical systems having a large number of optical channels. Plural optical splitters can be deployed in several configurations, depending upon overall system requirements. In one embodiment, each output port of a two-way splitter is connected to the optical splitter 90 of FIG. 1. In another embodiment, two or more optical splitters having the configuration of splitter 90 can be connected in series.

Each of the N output paths 92 optically communicates with a wavelength selecting module 100, best seen in FIG. 2. The y output ports are supplemental output ports which are not coupled to wavelength selecting modules 100. The y output ports configure the demultiplexer for readily coupling to additional wavelength selecting modules for incremental system expansion. Advantageously, optical splitter 90 is a separate module from wavelength selecting modules 100 and is separately packaged from the wavelength selecting modules. As used herein, the expression "separately packaged" describes the manner in which the optical components are housed. The splitter is enclosed by a housing separate from the housings which enclose each wavelength selecting module. Typically, the inputs and outputs for both the splitter module and the wavelength selector module are connectors, e.g., FC/PC connectors or SC/PC connectors. Optical coupling among the modules is readily accomplished through connection using the connectorized input/output ports. In this manner, wavelength selection is completely independent of multiplexed optical signal division, enabling system reconfiguration merely through interconnection of the desired modules.

FIG. 2 schematically depicts an exemplary wavelength selecting module 100 for use in optical communication system 10. To perform channel selection, the multiplexed signal is routed through splitter 102 to optical filter 104. The filter passes optical signals having wavelengths other than the channel wavelength to be selected. These non-selected channels pass through low reflectivity port 105 and exit the optical communication system. The low reflectivity port 105 is typically an angled fiber cut, although any low reflectivity waveguide termination technique may be employed. The channel wavelength is reflected by filter 104 through splitter 102 and output through splitter output port 106. The unused optical signals exit splitter 102 through low-reflectivity port 107. Optionally, an optical tap may be interposed between input port 101 and splitter 102. Such an optical tap removes a small portion of the multiplexed optical signal, typically 1% or 5% of the signal. The tapped signal can be used in a variety of signal monitoring techniques for controlling the optical system.

In an exemplary embodiment, the optical filter comprises a Bragg grating member which reflects the channel wavelength and transmits all other wavelengths. Consequently, the channel wavelengths emitted by the transmitters are matched to the reflection wavelengths of the Bragg gratings incorporated in the wavelength selectors. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein. In an exemplary embodiment, the gratings are produced by exposing high germania-content silica-based optical fibers to ultraviolet radiation to form the photoinduced refractive index perturbations. In another embodiment, Bragg gratings can be fabricated in accordance with the techniques described in Erdogan et al., "Fiber Phase Gratings Reflect Advances in Lightwave Technology," *Laser Focus World*, February, 1994, the disclosure of which is incorporated by reference herein.

To provide temperature stability for the Bragg grating, region 108 is optionally connected to an environmental control element for maintaining the grating within a desired temperature range. In an exemplary embodiment, environmental control element is a thermoelectric cooler or a resistive heater and the temperature range is approximately plus or minus one degree Celsius around a set temperature. When more than one Bragg grating is included in the wavelength selector module, a single environmental control element can be used for temperature stability of plural gratings. Alternatively, the environmental control elements can be used to tune the wavelength of the Bragg grating. Thermal tuning can be used to maintain the reflection wavelength of the grating or it can be used to shift the reflection wavelength of the grating to a different optical channel or to a reflection wavelength between optical channels. Thermal wavelength shifting can be employed for routing optical wavelengths to different locations.

The selected channel wavelength is output from wavelength selector module 100 through selector output port 110. Output port 110 is optically coupled to optical receiver 120 through receiver port 122. Optionally, the signal may be optically amplified before it reaches the receiver. Receiver 120 generally detects the optical signal and converts it to an electrical signal, typically through the use of a photodiode device. Various optical receivers suitable for use in optical system 10 are described in Gowar, *Optical Communication Systems*, discussed above. While the depicted optical receivers 120 are depicted as adjacent to the modular demultiplexer system, it is understood that an optical channel selected by any particular selector module 100 can be routed through a wide variety of optical path and devices before it is converted to an electrical signal by an optical receiving element. For example, the demultiplexed signal emerging from the wavelength selector module can be routed through another waveguide, e.g., in the case of dropping a channel to be sent to a separate geographic region or for optical LAN applications.

Optionally, plural wavelength selectors 100 can be packaged within a single wavelength selecting module to decrease the overall system size. In this configuration, an N-channel wavelength division multiplexed optical communication system is provided with a demultiplexer comprising a splitter module and wavelength selector modules, each wavelength selector module being configured to select fewer than N optical channels from a multiplexed signal. In an exemplary embodiment a wavelength selector module includes two wavelength selectors; each wavelength selector comprises a Bragg grating configured to reflect a different optical channel wavelength. The module includes two input ports 101, each input port optically coupled to an output port 92 of splitter 90, and two output ports 110, each output port optically coupled to an input port 122 of an optical receiver 120. Optionally, a wavelength selector module which includes more than one grating can include more than one heating element. In one embodiment, a separate heating element is provided for each grating in the wavelength selector module.

In optical communication system 10, the receiver will frequently be part of an existing optical communication system to which the optical channel wavelength is routed. Consequently, the optical system 10 can function with numerous types of receivers to ensure compatibility with existing optical equipment.

The modular nature of the expandable wavelength division multiplexed optical communication systems of the present invention provides several advantages over the integrated optical component approaches to demultiplexing of conventional WDM networks. The use of plural wavelength selector modules which are separately packaged from the wavelength splitter component enables the demultiplexer module to be easily manufactured, particularly since optical fiber handling is greatly simplified and parallel manufacturing is enabled. Manufacturing yield is increased with a concomitant decrease in cost since the failure of one demultiplexer component does not necessitate rejection of the entire assembled system, only replacement of the faulty module. In use, this feature translates into easy field replacement of damaged components. For example, the wavelength selector for a single channel can advantageously be replaced without affecting the remaining channels.

In operation, to increase the number of optical channels in the wavelength division multiplexed optical communication systems of the present invention, a new optical transmitter 20 is connected to one of the x input ports 34 of multiplexer 30. This new transmitter includes a source laser for outputting a new optical channel wavelength, designated the $(N+1)^{th}$ optical channel wavelength, which is different from the existing wavelengths of the N optical channels. To select the new optical channel wavelength, a new wavelength selector module 100, the $(N+1)^{th}$ channel selector module, is connected to one of the y output ports 94 of splitter 90. In this manner, the capacity of the WDM optical communication system is increased by one channel without the need to alter any of the existing optical channels.

While the foregoing invention has been described in terms of the embodiments discussed above, numerous variations are possible. For example, it is understood that the optical system configurations of the present invention permit a reduction in system capacity by decreasing the number of optical channels as readily as permitting an expansion in system capacity by increasing the number of optical channels. Accordingly, modifications and changes such as those suggested above, but not limited thereto, are considered to be within the scope of following claims.

What is claimed is:

1. An expandable wavelength division multiplexed optical communication system having at least N wavelengths, where N is a whole number greater than or equal to 2, the wavelength division multiplexed optical communication system comprising:

N source lasers for producing N optical channels, each channel having a unique wavelength;

an optical multiplexer module optically communicating with each of the N source lasers for optically combining the N optical channels to form a wavelength division multiplexed optical signal, the multiplexer having N+x inputs, where x is a whole number greater than or equal to 1, the N+x input ports being configured such that the N input ports are optically coupled to the N source lasers and the x input ports are supplemental ports not optically coupled to the N source lasers;

an optical transmission path optically communicating with the multiplexer for carrying the wavelength division multiplexed optical signal comprising the N optical channels;

N separately-packaged optical channel selecting modules, each selecting module including at least one Bragg grating, each Bragg grating configured to select a unique optical channel wavelength;

an optical splitter module optically communicating with the optical transmission path for receiving the wavelength division multiplexed optical signal and outputting portions of the wavelength division multiplexed optical signal onto plural output ports, the optical splitter module and having N+y output ports, where y is a whole number greater than or equal to 1, the N+y output ports being configured such that each of the N output ports are optically coupled to one of the N optical channel selecting modules and the y output ports are supplemental ports not optically coupled to any of the N optical channel selecting modules.

2. An expandable wavelength division multiplexed optical communication system as recited in claim 1 where N=4, x=4, and y=4.

3. An expandable wavelength division multiplexed optical communication system as recited in claim 1 where N=8, x=8, and y=8.

4. An expandable wavelength division multiplexed optical communication system having at least N wavelengths, where N is a whole number greater than or equal to 2, the wavelength division multiplexed optical communication system comprising:

N source lasers for producing N optical channels, each channel having a unique wavelength;

an optical multiplexer module optically communicating with each of the N source lasers for optically combining the N optical channels to form a wavelength division multiplexed optical signal;

an optical transmission path optically communicating with the optical multiplexer module for carrying the wavelength division multiplexed optical signal;

a plurality of separately packaged optical channel selecting modules, each selecting module including at least one Bragg grating configured to select a unique optical channel wavelength;

an optical splitter module for receiving the wavelength division multiplexed optical signal and outputting portions of the wavelength division multiplexed optical signal onto plural output ports, the optical splitter module optically communicating with the optical transmission path and the optical channel selecting modules and having N+y output ports, where y is a whole number greater than or equal to 1, the N+y output ports being configured such that each of the N output ports are optically coupled to one of the Bragg gratings and the y output ports are supplemental ports not optically coupled to the Bragg gratings.

5. An expandable wavelength division multiplexed optical communication system as recited in claim 4 wherein the total number of Bragg gratings in the plurality of optical channel selecting modules is greater than or equal to N.

6. An expandable wavelength division multiplexed optical communication system as recited in claim 5 in which each optical channel selecting module includes 2 Bragg gratings.

7. A method for increasing the number of channels in a wavelength division multiplexed optical communication system comprising:

providing a wavelength division multiplexed optical communication system having a capacity of N wavelengths, where N is a whole number greater than or equal to 2, the wavelength division multiplexed optical communication system comprising:

N source lasers for producing N optical channels, each channel having a distinct wavelength;

an optical multiplexer module optically communicating with each of the N source lasers for optically combining the N optical channels to form a wavelength division multiplexed optical signal comprised of N optical channels, the optical multiplexer having N+x inputs, where x is a whole number greater than or equal to 1;

an optical transmission path optically communicating with the optical multiplexer for carrying the wavelength division multiplexed optical signal;

an optical splitter module for receiving the wavelength division multiplexed optical signal and outputting portions of the wavelength division multiplexed optical signal onto plural outputs, the optical splitter module optically communicating with the optical transmission path and having N+y outputs, where y is a whole number greater than or equal to 1;

N optical selecting modules optically communicating with the splitter module, each selecting module including a Bragg grating configured to select a particular channel wavelength;

providing an $(N+1)^{th}$ source laser to the wavelength division multiplexed optical communication system such that source laser produces an $(N+1)^{th}$ optical channel which optically communicates with the optical splitter, the $(N+1)^{th}$ optical channel being combined with said wavelength division multiplexed optical signal comprised of N optical channels; and providing an $(N+1)^{th}$ optical selecting module optically including a Bragg grating configured to select the $(N+1)^{th}$ optical channel.

* * * * *